US012197861B2

(12) United States Patent
Sen et al.

(10) Patent No.: US 12,197,861 B2
(45) Date of Patent: Jan. 14, 2025

(54) LEARNING RULES AND DICTIONARIES WITH NEURO-SYMBOLIC ARTIFICIAL INTELLIGENCE

(71) Applicant: International Business Machines Corporation, Armonk, NY (US)

(72) Inventors: Prithviraj Sen, San Jose, CA (US); Marina Danilevsky Hailpern, San Jose, CA (US); Yunyao Li, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 17/179,949

(22) Filed: Feb. 19, 2021

(65) Prior Publication Data

US 2022/0269858 A1    Aug. 25, 2022

(51) Int. Cl.
| | | |
|---|---|---|
| *G06F 40/242* | (2020.01) | |
| *G06F 40/205* | (2020.01) | |
| *G06N 3/04* | (2023.01) | |
| *G06N 3/084* | (2023.01) | |

(52) U.S. Cl.
CPC .......... *G06F 40/242* (2020.01); *G06F 40/205* (2020.01); *G06N 3/04* (2013.01); *G06N 3/084* (2013.01)

(58) Field of Classification Search
CPC ....... G06F 40/242; G06F 40/205; G06N 3/04; G06N 3/084; G06N 5/025
See application file for complete search history.

(56) References Cited

U.S. PATENT DOCUMENTS

| | | | | |
|---|---|---|---|---|
| 5,146,406 A | * | 9/1992 | Jensen | G06F 40/211 |
| | | | | 704/9 |
| 5,878,386 A | * | 3/1999 | Coughlin | G06F 40/242 |
| | | | | 715/256 |
| 6,651,220 B1 | * | 11/2003 | Penteroudakis | G06F 16/3335 |
| | | | | 715/236 |
| 8,180,633 B2 | | 5/2012 | Collobert et al. | |

(Continued)

FOREIGN PATENT DOCUMENTS

JP    2016035657    3/2016

OTHER PUBLICATIONS

Hartmann, S., et al., "Generating Training Data for Semantic Role Labeling based on Label Transfer from Linked Lexical Resources", Transactions of the Association of Computational Linguistics, vol. 4, pp. 197-213, Apr. 2016.

(Continued)

*Primary Examiner* — Bhavesh M Mehta
*Assistant Examiner* — Nandini Subramani
(74) *Attorney, Agent, or Firm* — Joseph P. Curcuru

(57) ABSTRACT

A system, computer program product, and method are provided for jointly learning dictionary based rules and dictionary candidates. Natural language text is received and parsed into subsets, with the subset being subjected to natural language processing to identify one or more verbs within the subset. The identified verbs are evaluated with respect to a dictionary and one or more rules. The evaluation is directed at each predicate in the rules with respect to the identified verbs. A neural network is leveraged to jointly induce modification of the rules and one or more dictionaries responsive to the evaluation.

18 Claims, 9 Drawing Sheets

(56) References Cited

U.S. PATENT DOCUMENTS

| | | | |
|---|---|---|---|
| 8,583,422 B2 | 11/2013 | Todhunter et al. | |
| 2008/0221878 A1* | 9/2008 | Collobert | G06F 40/30 704/232 |
| 2014/0136188 A1* | 5/2014 | Wroczynski | G06F 40/284 704/9 |
| 2018/0173698 A1* | 6/2018 | Dubey | G06F 16/3347 |
| 2021/0240917 A1 | 8/2021 | Sen | |
| 2022/0050967 A1* | 2/2022 | Veyseh | G06F 40/289 |

OTHER PUBLICATIONS

Prentzas, J., et al., "Improving the Accuracy of Neuro-Symbolic Rules with Case-Based Reasoning", 1st International Workshop on Combinations of Intelligent Methods and Applications (CIMA 2008) in conjunction with 18th European Conference on Artificial Intelligence (ECAI-08), Jul. 2008.

Coden, A., et al., "SPOT the drug! An unsupervied pattern matching method to extract drug names from very large clinical corpora", 2012 IEEE Second Conference on Healthcare Informatics, Imaging and Systems Biology, pp. 33-39, 2012.

Alba, A., et al., "Language Agnostic Dictionary Extraction", International Semantic Web Conference, 2017.

Hamilton, William, L., et al., "Inducing Domain-Specific Sentiment Lexicons from Unlabeled Corpora", Proceedings of the Conference on Empirical Methods in Natural Language Processing, pp. 595-605, Nov. 2016.

Ranganath, Rajesh, et al., "It's Not You, it's Me: Detecting Flirting and its Misperception in Speed-Dates", Proccedings of the 2009 Conference on Empirical Methods in Natural Language Processing, pp. 334-342, Aug. 2009.

Tang, Duyu, et al., "Building Large-Scale Twitter-Specific Sentiment Lexicon: a Representation Learning Approach", Proceeding of COLING 2014, the 25th International Conference on Computational Linguistics: Technical Papers, pp. 172-182, 2014.

Asghar, Muhammad Zubair, et al., "A Unified Framework for Creating Domain Dependent Polarity Lexicons from User Generated Reviews", PLoS ONE 10(10): e0140204. https://doi.org/10.1371/journal.pone.0140204, published Oct. 14, 2015.

Pryzant, Reid, et al., "Deconfounded Lexicon Induction for Interpretable Social Science", Proceedings of NAACL-HLT 2018, pp. 1615-1625, Jun. 2018.

Bravo-Marquez, Felipe, et al., "From Unlabelled Tweets to Twitter-specific Opinion Words", SIGIR '15: Proceedings of the 3th International ACM SIGIR Conference on Research and Development in Information Retrieval, pp. 743-746, Aug. 2015.

Severyn, Aliaksei, et al., "On the Automatic Learning of Sentiment Lexicons", Human Language Technologies: The 2015 Annual Conference of the the North American Chapter of the ACL, pp. 1397-1402, Jan. 2015.

Taboada, Maite, et al., "Lexicon-Based Methods for Sentiment Analysis", Computational Linguistics, vol. 37, No. 2., pp. 267-307, Jun. 2011.

Evans, Richard, et al., "Learning Explanatory Rules from Noisy Data", Journal of Artificial Intelligence Research 61, pp. 1-64 (2018).

Dong, Honghua, et al., "Neural Logic Machines", ICLR 2019 conference.

Yang, Fan, et al., "Differentiable Learning of Logical Rules for Knowledge Base Reasoning", 31st Conference on Neural Information Processing Systems (NIPS 2017).

* cited by examiner

LEARNING RULES AND DICTIONARIES WITH NEURO-SYMBOLIC ARTIFICIAL INTELLIGENCE

BACKGROUND

The present embodiment(s) relate to a computer system, computer program product, and a computer-implemented method using artificial intelligence (AI) and machine learning for learning rules and dictionaries. It is understood that systems are available to support and enable manual construction of dictionaries, which is a burdensome task. As shown and described herein, AI is utilized to enable computers and machines to mimic the perception, learning, problem-solving, and decision-making capabilities of the human mind.

A dictionary is understood in the art as a collection of words that can be used to pre-annotate one or more documents. A new annotation is created for each word in the document text that matches a term in the dictionary. A ML model can be configured with one or more dictionaries, which are typically domain-specific. In machine learning (ML), a dictionary groups together words and phrases that share one or more common characteristics. An entry in the dictionary does not mean that all words in the entry mean the same thing, but that the words are to be treated equivalently by a model. In an exemplary embodiment, the dictionary is a collection of words or phrases that are equivalent for information-extraction purposes, meaning that they are interchangeable for the purposes of identifying entity and relation mentions. Rules with one or more predicates are utilized to define conditions that determine placement of a word, also referred to herein as a token, in a dictionary. The embodiments shown and described herein are directed at ML and jointly inducing rules and dictionaries to mitigate or eliminate the manual burden associated with dictionary construction.

SUMMARY

The embodiments disclosed herein include a computer system, computer program product, and computer-implemented method for automatically and selectively learn dictionary and corresponding rules and embedded predicates, and dynamically induce modification thereof. Those embodiments are further described below in the Detailed Description. This Summary is neither intended to identify key features or essential features or concepts of the claimed subject matter nor to be used in any way that would limit the scope of the claimed subject matter.

In one aspect, a computer system is provided with a processor operatively coupled to memory, and an artificial intelligence (AI) platform operatively coupled to the processor. The AI platform is configured with tools in the form of a text module, a natural language processing (NLP) module, an evaluator, and a machine learning (ML) module configured with functionality to support jointly learning dictionary based rules and dictionary candidates. The text module is configured to receive natural language text and to parse the received text into one or more subsets. The NLP module, which is operatively coupled to the text module, is configured to subject the subset to natural language processing to identify one or more verbs within the subset. The evaluator, which is operatively coupled to the NLP module, is configured to evaluate the identified verb(s) with respect to a dictionary and one or more rules. The evaluation is directed each predicate in the rules with respect to the identified verbs. In an exemplary embodiment, the evaluator assesses a score for each of the identified one or more verbs across the one or more rules and selects a maximum score as a subset score for the subset. The ML module, which is operatively coupled to the evaluator, is configured to leverage a neural network to jointly induce modification of the rules and one or more dictionaries responsive to the evaluation.

In another aspect, a computer program product is provided to support jointly learning dictionary based rules and dictionary candidates. The computer program product is provided with a computer readable storage medium having embodied program code. The program code is executable by the processing unit with functionality to receive natural language text and to parse the received text into one or more subsets. The subset is subjected to natural language processing to identify one or more verbs within the subset. The program code supports functionality to evaluate the identified verb(s) with respect to a dictionary and one or more rules. The evaluation is inclusive of each predicate in the rules with respect to the identified verbs. In an exemplary embodiment, the program code assesses a score for each of the identified one or more verbs across the one or more rules and selects a maximum score as a subset score for the subset. Program code is further provided and executable to leverage a neural network to jointly induce modification of the rules and one or more dictionaries responsive to the evaluation.

In yet another aspect, a method is provided for supporting jointly learning dictionary based rules and dictionary candidates. Natural language text is received and parsed into one or more subsets. The subset is subjected to natural language processing to identify one or more verbs within the subset. The identified verb(s) are evaluated with respect to a dictionary and one or more rules. The evaluation includes evaluating each predicate in the rules with respect to the identified verbs. In an exemplary embodiment, a score is assessed for each of the identified one or more verbs across the one or more rules and a maximum score is selected as a subset score for the subset. A neural network is leveraged to jointly induce modification of the rules and one or more dictionaries responsive to the evaluation.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
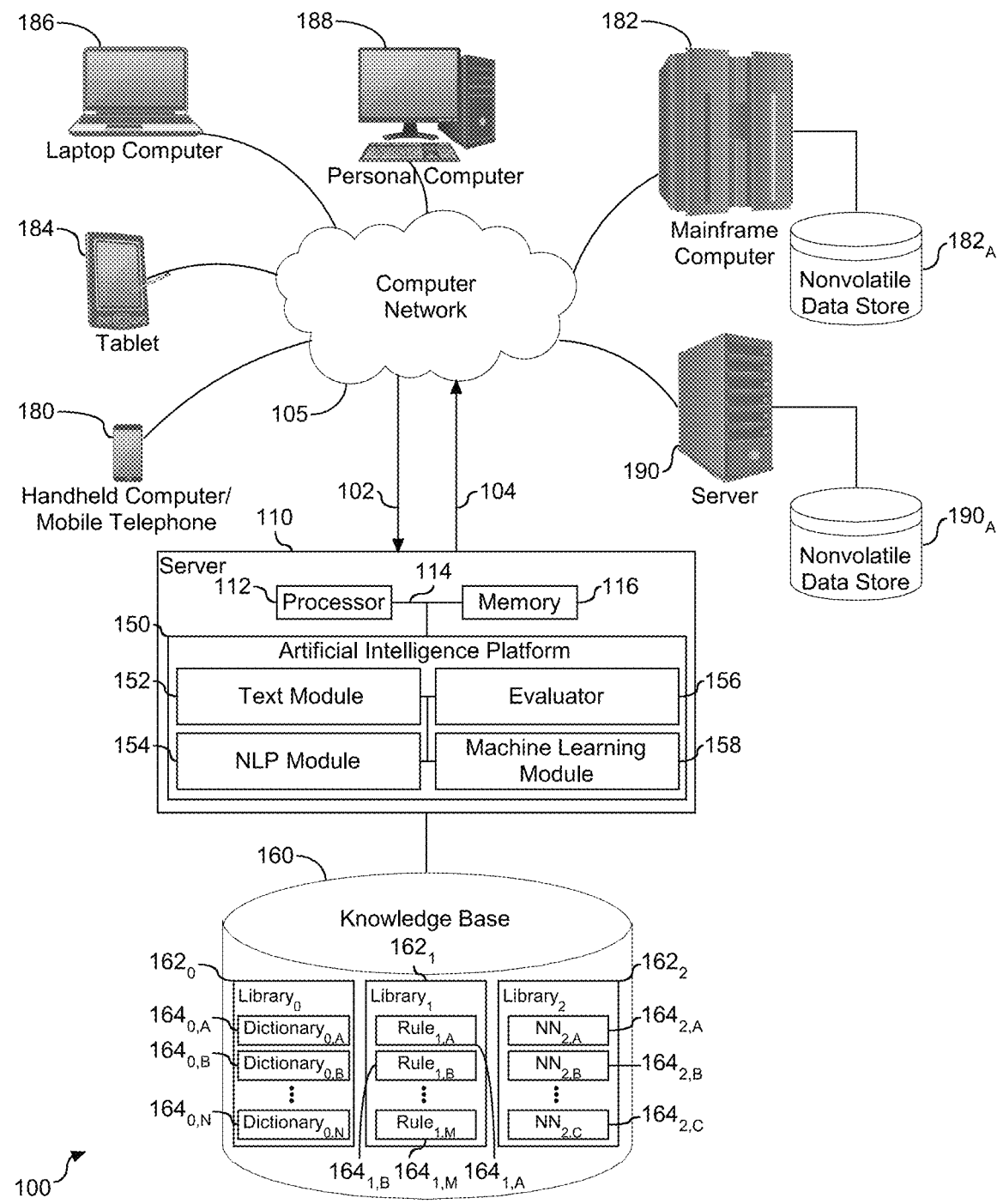
FIG. 1 depicts a system diagram illustrating a schematic diagram of a computer system and embedded tools to support neuro-symbolic AI to jointly induce both rules and dictionaries.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language (NL) systems (such as the IBM Watson® artificially intelligent computer system or other natural language interrogatory answering systems) process NL based on system acquired knowledge.

In the field of AI computer systems, natural language processing (NLP) systems process natural language based on acquired knowledge. NLP is a field of AI that functions as a translation platform between computer and human languages. More specifically, NLP enables computers to analyze and understand human language. Natural Language Understanding (NLU) is a category of NLP that is directed at parsing and translating input according to natural language principles. Examples of such NLP systems are the IBM Watson® artificial intelligent computer system and other natural language question answering systems.

Machine learning (ML), which is a subset of AI, utilizes algorithms to learn from data and create foresights based on the data. ML is the application of AI through creation of models, for example, artificial neural networks that can demonstrate learning behavior by performing tasks that are not explicitly programmed. There are different types of ML including learning problems, such as supervised, unsupervised, and reinforcement learning, hybrid learning problems, such as semi-supervised, self-supervised, and multi-instance learning, statistical inference, such as inductive, deductive, and transductive learning, and learning techniques, such as multi-task, active, online, transfer, and ensemble learning.

At the core of AI and associated reasoning lies the concept of similarity. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding NL and processing content response to the identification and understanding as well as changes to the structures are extremely difficult at a practical level.

Artificial neural networks (ANNs) are models of the way the nervous system operates. Basic units are referred to as neurons, which are typically organized into layers. The ANN works by simulating a large number of interconnected processing units that resemble abstract versions of neurons. There are typically three parts in an ANN, including an input layer, with units representing input fields, one or more hidden layers, and an output layer, with a unit or units representing target field(s). The units are connected with varying connection strengths or weights. Input data is presented to the first layer, and values are propagated from each neuron to neurons in the next layer. At a basic level, each layer of the neural network includes one or more operators or functions operatively coupled to output and input. The outputs of evaluating the activation functions of each neuron with provided inputs are referred to herein as activations. Complex neural networks are designed to emulate how the human brain works, so computers can be trained to support poorly defined abstractions and problems where training data is available. ANNs are often used in image recognition, speech, and computer vision applications.

Natural Language Processing (NLP) is a field of AI and linguistics that studies problems inherent in process and manipulation of natural language, with an aim to increase the ability of computers to understand human languages. NLP focuses on extracting meaning from unstructured data.

A set of rules defines patterns for annotating text. If a pattern is applied, then the actions of the rule are performed on the matched annotations. In an exemplary embodiment, a rule specifies one or more conditions that must match, an optional qualifier, a list of additional constraints that the matched text must fulfill, and the actions to be taken when a match occurs, such as creating a new annotation or modifying an existing annotation. As shown and described herein, the set of rules and their conditions are applied to a select set of NL to ascertain whether to assign a label to the select set of NL. Neuro-symbolic AI, which combines knowledge-driven symbolic AI and data-driven ML approaches, is leveraged to jointly induce one or more rules and one or more dictionaries.

Referring to FIG. 1, a computer system (100) is provided with tools to support neuro-symbolic AI to jointly induce both rules and dictionaries. As shown, a server (110) is provided in communication with a plurality of computing devices (180), (182), (184), (186), (188), and (190) across a network connection (105). The server (110) is configured with a processing unit (112) operatively coupled to memory (116) across a bus (114). A tool in the form of an artificial intelligence (AI) platform (150) is shown local to the server (110), and operatively coupled to the processing unit (112) and memory (116). As shown, the AI platform (150) contains tools in the form of a text module (152), a NLP module (154), an evaluator (156), and a ML module (158). Together, the tools provide functional support to leverage ML to jointly update one or more dictionaries and one or more rules, over the network (105) from one or more computing devices (180), (182), (184), (186), (188), and (190). The computing devices (180), (182), (184), (186), (188), and (190) communicate with each other and with other devices or components via one or more wires and/or wireless data communication links, where each communication link may comprise one or more of wires, routers, switches, transmitters, receivers, or the like. In this networked arrangement, the server (110) and the network connection (105) enable joint update of one or more dictionaries and one or more rules across distributed resources. Other embodiments of the server (110) may be used with components, systems, subsystems, and/or devices other than those that are depicted herein.

The tools, including the AI platform (150), or in one embodiment, the tools embedded therein including the text module (152), the NLP module (154), the evaluator (156), and the ML module (158), may be configured to receive input from various sources, including but not limited to input from the network (105), and an operatively coupled knowledge base (160). As shown herein, the knowledge base (160) includes a first library ($162_0$) of existing dictionaries, a second library ($162_1$) of existing rules, and a third library ($162_2$) of neural networks. The dictionaries of the first library ($162_0$) are shown herein by way of example as dictionary$_{0,A}$ ($164_{0,A}$), dictionary$_{0,B}$ ($164_{0,B}$), and dictionary$_{0,N}$ ($164_{0,N}$). The quantity of dictionaries in the first library ($162_0$) is for illustrative purposes and should not be considered limiting. In an embodiment, the knowledge base (160) may include one or more additional libraries, each having one or more dictionaries. Types of dictionaries include, but are not limited to, a verb dictionary and a non-agent dictionary. As further shown herein, the second library ($162_1$) is populated with existing rules, shown herein by way of example as rule$_{1,A}$ ($164_{1,A}$), rule$_{1,B}$ ($164_{1,B}$) and rule$_{1,M}$ ($164_{1,M}$). Each rule includes one or more predicates, also referred to herein as conditions, to interface with one or more of the dictionaries in the first library ($162_0$). The quantity of rules in the second library ($162_1$) is for illustrative purposes and should not be considered limiting. The third library ($162_2$) is populated with neural networks (NNs), shown herein by way of example as NN$_{2,A}$ ($164_{2,A}$), NN$_{2,B}$ ($164_{2,B}$), and NN$_{2,C}$ ($164_{2,C}$). One or more of the NNs of the third library ($162_2$) are leveraged to evaluate the natural language (NL) text and selectively assign a label responsive to the evaluation, and selectively jointly amend one or more dictionaries and corresponding rules. The quantity of NNs in the third library ($162_2$) is for illustrative purposes and should not be considered limiting.

The various computing devices (180), (182), (184), (186), (188), and (190) in communication with the network (105) demonstrate access points for the AI platform (150) and the corresponding tools, e.g. modules and evaluator, including the text module (152), the NLP module (154), the evaluator (156), and the ML module (158). Some of the computing devices may include devices for use by the AI platform (150), and in one embodiment the tools (152), (154), (156), and (158) to support jointly learning dictionary based rules and dictionary candidates from NL text. The network (105) may include local network connections and remote connections in various embodiments, such that the AI platform (150) and the embedded tools (152), (154), (156), and (158) may operate in environments of any size, including local and global, e.g. the Internet. Accordingly, the server (110) and the AI platform (150) serve as a front-end system, with the knowledge base (160) and one or more of the dictionaries, rules, and NNs serving as the back-end system.

As described in detail below, the server (110) and the AI platform (150) process non-annotated NL text to identify and extract grammatical components. The AI platform (150) utilizes the text module (152) to receive the NL text. In an exemplary embodiment, the NL text may be transmitted across the network (105) from one or more of the operatively coupled machines or systems. The NL module (152) parses the received NL text into one or more subsets, with each subset having at least one phrase or sentence. In an exemplary embodiment, the subset may be limited to a phrase, a sentence, a plurality of phrases, a plurality of sentences, one or more paragraphs, etc. The granular size of the subset is configurable and should not be considered limiting. The parsed NL text is subject to NLP via the operatively coupled NLP module (154). The NLP identifies one or more grammatical components of the NL text, including but not limited to, verbs and contextual usage of the verbs. Accordingly, the initial aspects shown herein are directed to the granularity of the text and identification of verbs in the text.

The evaluator (156), which is shown herein operatively coupled to the NLP module (154), is configured to evaluate the verbs that have been identified by the NLP module (156). The evaluation leverages at least one dictionary from the first library ($162_0$) of knowledge base (160), and at least one rule from the second library ($162_1$). The at least one rule includes one or more predicates, also referred to herein as conditions. In an exemplary embodiment, given the rule, the verb is evaluated against all predicates in the rule. Accordingly, the evaluation of the identified verb(s) is directed at the one or more predicates that are embedded or attached to the rule(s) being applied to the verb(s). If the predicate is a dictionary-based predicate, then the dictionary is indicated within the predicate, and the indicated dictionary is used to evaluate the verb. In an exemplary embodiment, a data structure, e.g. hash table, may be used as an efficient and practical tool to identify the association between the predicate and the dictionary. The evaluator (156) processes each of the identified verbs in the corresponding NL text against the rule(s) predicate(s) and with respect to a dictionary from the first library ($162_0$). The evaluator (156) assesses a score for each of the identified verbs, with the assessment conducted across the rule(s). For each dictionary based predicate in the one or more rules, the evaluator (156) identifies a semantic role label of each verb, looks up text from the NL text that is associated with the verb for the same semantic role label, and chooses a word in the leveraged dictionary with the highest score. Semantic role labeling is a process of assigning a known semantic role to a phrase in a sentence to indicate the role of the phrase with respect to a corresponding verb.

Figure 3A:
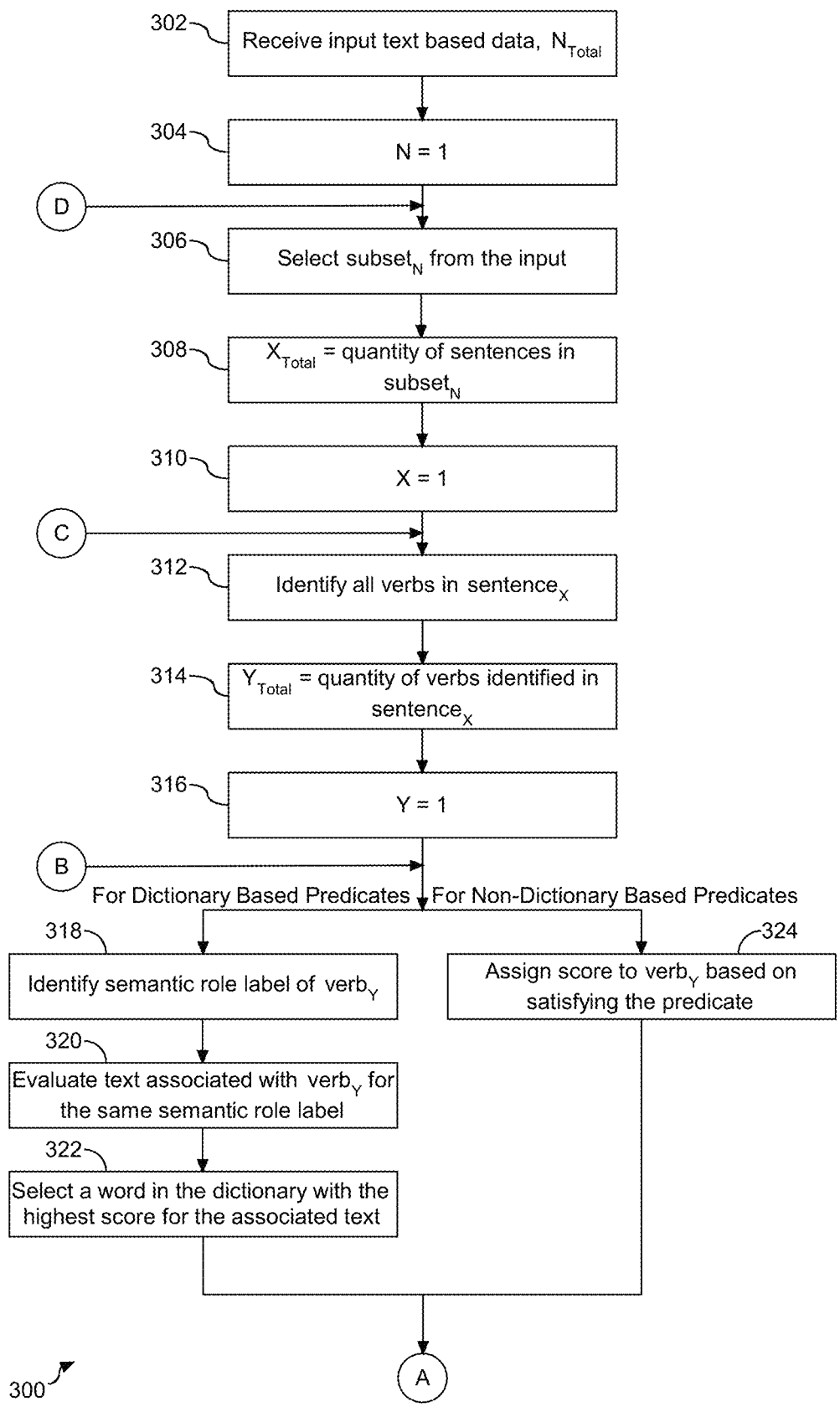
FIGS. 3A and 3B depict a flow chart to illustrate an initial aspect of processing and evaluating verbs within NL text.
Figure 3B:
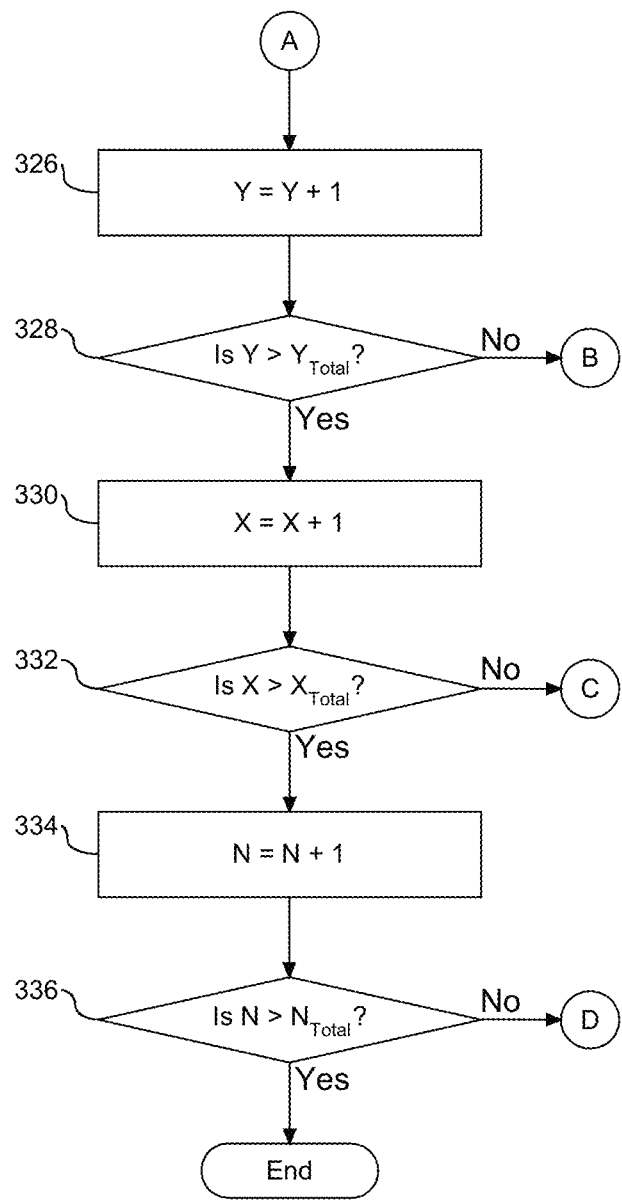

Details of the steps leveraged by the evaluator (156) are shown and described in FIGS. 3A and 3B. Within NLP, semantic role labeling structurally represents the meaning of the sentence. The evaluator (156) conducts the verb assessment for each identified verb in the NL subset. For example, if the subset is a sentence, the verb assessment is conducted for each verb in the sentence, and if the verb assessment is conducted for a group of sentences or a paragraph, the verb assessment is conducted for the group or sentence or the paragraph.

After the verb assessment is completed, each identified verb has a corresponding score, either selected from the dictionary or assigned based on satisfaction of the rule predicate. After the functionality of the verb assessment is conducted, the evaluator (156) selects the maximum verb score across all the verbs identified in the subset and assigns the selected maximum score to the subset. Accordingly, the evaluator (156) individually assesses the verbs and assigns a score to the subset based on the verb assessment(s).

Ground truth (GT) is a set of natural language data consisting of annotations that is used to adapt a machine learning model to a particular domain. Ground truth (GT) is a term used in machine learning that refers to information provided by direct observation, e.g. empirical evidence, as opposed to information provided by inference. Attaching one or more taxonomy tags, referred to herein as labels, to GT data provides structure and meaning to the data. Annotated GT, or an annotation, is attached to the document or in one embodiment elements of the document, and indicates the subject matter of elements present within the document. In an embodiment, the annotation is created and attached by annotators of different skillsets reviewing documents. GT is used to train ML models, measure model performance in the form of precision and recall.

Each subset of the NLP has a corresponding ground truth label. The evaluator (156) identifies the subset GT label, and conducts a comparison of the GT label with the subset score. In the case of learning dictionary-based rules for classifying sentences, the labeled data consists of labeled sentences. For each sentence in the labeled data, the GT label indicates whether the label belongs to the sentence, e.g. '1', or not, e.g. '0'. In an exemplary embodiment, this association between a sentence and its GT label can be made more explicit using an appropriate data structure, such as a hash table. For example, given a hash table that maps the identifier of the sentence to its GT label, identifying the GT label given the sentence identifier can be performed efficiently and easily by a hash table lookup. Details for the GT label comparison are shown and described in FIG. 4. In an exemplary embodiment, the evaluator (156) identifies a score in the dictionary corresponding to the GT label, and leverages the GT score in view of the subset score for the comparison, with the comparison output generating a loss function. The loss function is a measurement of the difference or error between the GT label for the subset and the subset score. In an exemplary embodiment, the loss function is utilized as feedback to an associated NN. The evaluator (156) interfaces with the leveraged NN, with the NN configured to compute one or more gradients, e.g. a gradient descent, from the generated loss function. Gradient descent is an optimization algorithm used to train the NN. The loss function is utilized by the ML module (158) to interface with the corresponding dictionary and rule(s), and more specifically to selectively amend the corresponding dictionary and rule(s) based on the computed gradient(s). In an exemplary embodiment, the selective updating is based on the computed gradient, and may be considered as a by-product of the gradient computation. The amendment updates one or more of the scores, including the rule score, r, the predicate score, p, and the word score, w. In an exemplary embodiment, the score(s) are parameters that are updated through backpropagation. In an exemplary embodiment, the backpropagation is applied separately to the rules, predicates, and words. With respect to the rule, the update of the rule score, r, is assessed as follows:

$$\Delta r = \eta \times \frac{\partial \ell}{\partial r} \quad \text{Equation 1}$$

where $\ell$ denotes the value of the loss function, $\delta$ denotes a partial derivative and $\eta$ denotes a scaling constant (step size). With respect to a predicate score, p, to be updated, the updated predicate score is assessed as follows:

$$\Delta p = \eta \times \frac{\partial \ell}{\partial r} \frac{\partial r}{\partial p} \quad \text{Equation 2}$$

With respect to the word score, w, to be updated, the updated word score is assessed as follows:

$$\Delta w = \eta \times \frac{\partial \ell}{\partial r} \frac{\partial r}{\partial p} \frac{\partial p}{\partial w} \quad \text{Equation 3}$$

As shown, loss is first assessed for the rule score, r, Since the predicate is part of the rule, the predicate score, p, is based on the rule score, r. Accordingly, the initial loss assessment is directed at the rule score, and how much of the rule score is attributable to the predicate score, and based or assuming the predicate is dictionary-based, the assessment determines how much of the affect attributed to the predicate can be attributed to the specific word.

The update with respect to the dictionary may be in the form of amending a score of one or more words, e.g. tokens, in the dictionary, and the update with respect to the rule may be in the form of adding or removing a predicate in the corresponding rule(s). In an exemplary embodiment, the NN learns a predicate to include in the rule(s) as described below. Similar to the case of words being assigned scores for inclusion into a dictionary, predicates are also assigned scores for inclusion into the rule. When learning a dictionary is initiated, each word is assigned a randomly chosen score. During an update process driven by gradients and backpropagation, the word scores get updated. At such time as convergence is achieved, words whose converged score is high, e.g. close to 1, are identified, as opposed to words with a low converged score, e.g. close to 0. The words with high scores are included in the dictionary, whereas the low scoring words are excluded from the dictionary, e.g. discarded. An identical process determines how the NN learns to include a predicate into a rule. Initially, all predicates are assigned randomly chosen scores via backpropagation, these predicate scores are updated. Once convergence is achieved, the predicate that has received the highest score is included as part of the rule. In response to amendment of the dictionary and the rule(s), the ML module (158) backpropagates the computed gradient(s) through the corresponding NN to update parameters for the learned rule and each dictionary learning module. The error value associated with the gradients is propagated backwards through the weights of the NN starting with the output neurons through the hidden layer(s) and to the input layer. Accordingly, as shown herein, the learned rule and each corresponding dictionary are jointly updated based on the computed gradient.

The evaluation of the NL text by the modules (152), (154), and (158), and the evaluator (156) continues with a subsequent subset of NL text, and terminates or concludes when there is a convergence of the computed gradients. In an exemplary embodiment, the tools of the AI platform (150) are subject to training with thousands of subsets of NL text from a particular domain, and a plurality of corresponding dictionaries.

Although shown as being embodied in or integrated with the server (110), the AI platform (150) may be implemented in a separate computing system (e.g., 190) that is connected across the network (105) to the server (110). Similarly, although shown local to the server (110), the tools (152), (154), (156), and (158) may be collectively or individually distributed across the network (105). Wherever embodied, the text module (152), NLP module (154), evaluator (156), and ML module (158) are utilized to jointly and automatically learn dictionaries and correspond rules, thereby mitigating if not eliminating human-in-the-loop.

Types of information handling systems that can utilize server (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188) and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

An information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
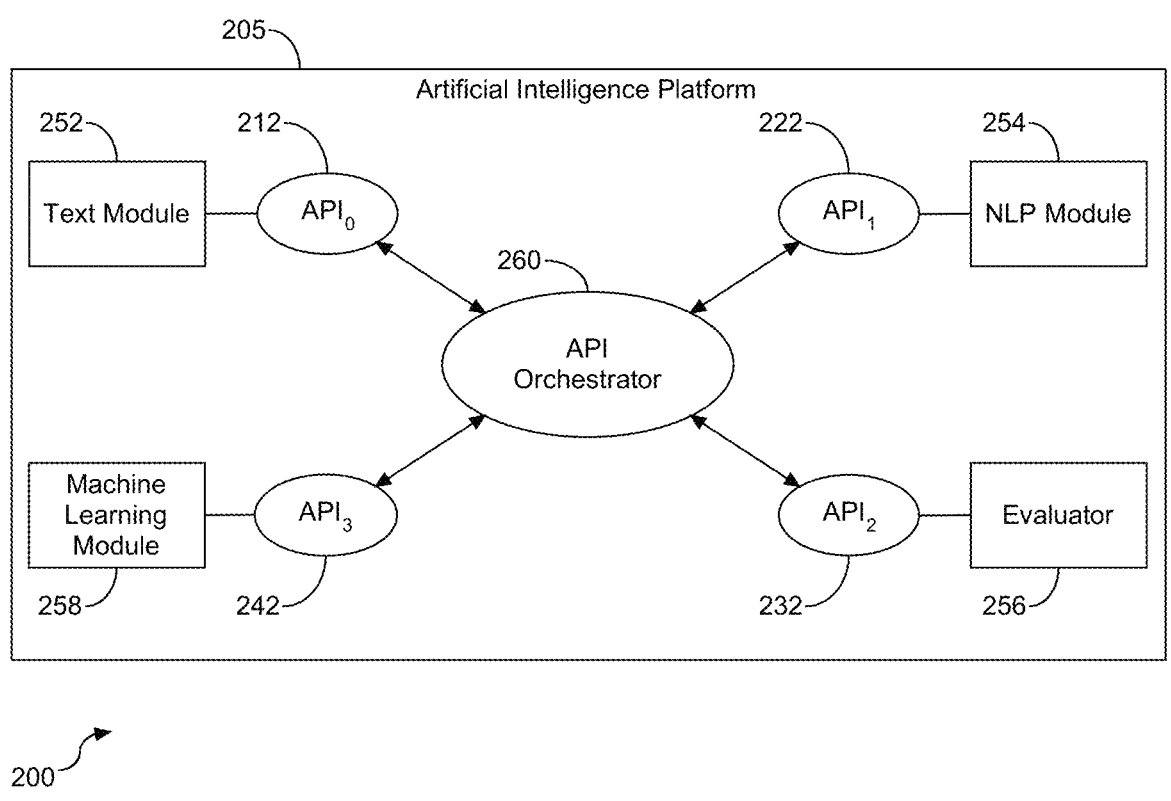
FIG. 2 depicts a block diagram a block diagram is provided illustrating the tools shown in FIG. 1 and their associated APIs.

An Application Program Interface (API) is understood in the art as a software intermediary between two or more applications. With respect to the joint learning of both the dictionaries and rules and selective amendment thereof shown and described in FIG. 1, one or more APIs may be utilized to support one or more of the AI platform tools, including the text module (152), NLP module (154), evaluator (156), and the ML module (158), and their associated functionality. Referring to FIG. 2, a block diagram (200) is provided illustrating the AI platform tools and their associated APIs. As shown, a plurality of tools are embedded within the AI platform (205), with the tools including the text module (252) associated with $API_0$ (212), the NLP module (254) associated with $API_1$ (222), the evaluator (256) associated with $API_2$ (232), and the ML module (258) associated with $API_3$ (242). Each of the APIs may be implemented in one or more languages and interface specifications.

$API_0$ (212) provides support for received NL text and the initial parsing of the text into subsets. $API_1$ (222) provides support for NLP of the subsets for identification of verbs present within the subsets. $API_2$ (232) provides support for evaluating the identified verbs in view of at least one dictionary and one or more rules, with each rule having one or more predicates that define the parameters of the rule. The evaluation by $API_2$ (232) is directed at each of the predicates with respect to the verbs identified by $API_1$ (222). $API_3$ (242) provides support for leveraging a neural network to jointly induce modification of both the one or more rules and the at least one dictionary.

As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Referring to FIGS. 3A and 3B, a flow chart (300) is provided to illustrate an initial aspect of processing and evaluating verbs within NL text. Input text based data is received in the form of a plurality of sentences, $N_{Total}$, (302). In an exemplary embodiment, the quantity may be vast, e.g. thousands of sentences. The NL text may be unstructured or semi-structured. There is no requirement that the received NL text have some initial data therein that has been previously annotated. The NL text received at step (302) is separated or divided into subsets, with the size of the subset being a configurable element. A subset size may be a quantity of phrases, sentences, paragraphs, etc. Regardless of the subset size, a subset counting variable N is initialized (304), followed by selection of $subset_N$ from the input (306). In an exemplary embodiment and for descriptive purposes, the subset, e.g. $subset_N$, is evaluated on a sentence basis. However, this level of granularity for the text evaluation should not be considered limiting. For example, in an embodiment, the text evaluation may be conducted on a multi-sentence basis, or on a phrase basis. As shown herein, the variable $X_{Total}$ is assigned to the quantity of sentences in $subset_N$ (308), and a corresponding sentence counting variable, X, is initialized (310). The initial aspect of NLP is to identify all the verb(s) found in $sentence_x$ (312). Accordingly, as shown herein, prior to evaluating the verbs, the NL text is separated or divided into subsets, and within each subset sentence, NLP is conducted to identify verbs presents within the NL text.

Each identified verb is subject to further processing. More specifically, the identified verbs are run through rules and dictionaries to generate predictions directed at the identified verbs. The variable $Y_{Total}$ is assigned to the quantity of verbs identified in $sentence_x$ (314), and a corresponding verb counting variable, Y, is initialized (316). Each verb has associated features that in an exemplary embodiment are identified or utilized to identify the corresponding verb. Examples of such features include, but are not limited to, objects and agents. The identified verbs are individually processed through one or more rules and one or more dictionaries. In an exemplary embodiment, at least one candidate rule and at least one candidate dictionary are identified and leveraged. Similarly, in an embodiment, the candidate dictionary or dictionaries may be populated with a plurality of words, with each word having a property reflecting the strength of the word with respect to its membership in the dictionary and a corresponding counter value. In an embodiment, the dictionary may be empty, e.g. not have populated words.

As shown and described herein, there are two parallel paths for processing the verbs through the rule predicates for both dictionary and non-dictionary based predicates. A dictionary based predicate is a condition defined within the scope of a corresponding dictionary, and a non-dictionary based predicate is a condition that is not defined within the scope of a corresponding dictionary. Examples of a non-dictionary based predicate includes, is the verb in the present tense, is the verb in an active voice, is the verb in a passive voice, etc. A non-limiting example of a rule with two dictionary based predicates is as follows:

Label(S)→∃a∈S: matchesDict(a.VB,VBDict)^ matchesDict(a.A1,NonAgentDict)

In this example, there is one rule with two conditions, and each condition is directed at different properties of the verb. One condition in this example is directed at a verb based dictionary and a second condition is directed at a non-agent dictionary. In an exemplary embodiment, the rule may include a plurality of predicates, and the quantity of predicates shown in this example should not be considered limiting. For the dictionary based predicate(s), the semantic role label of the verb, e.g. $verb_Y$, to which the dictionary corresponds is identified (318). It is understood in the art that verbs can be associated with various semantic role labels, such as, but not limited to, agents, non-agents, and context. The text associated with $verb_Y$ is evaluated for the same semantic role label (320), and a word in the dictionary with the highest score for the associated text is selected (322). The score associated with the selected word is the score of the predicate for $verb_Y$. For the non-dictionary based predicate(s), a score of 1 is assigned if $verb_Y$ satisfies the predicate, and a score of 0 is assigned if $verb_Y$ does not satisfy the predicate (324). It is understood that the sentence may have more than one verb. Following either step (322) or step (324), the verb counting variable, Y is incremented (326), and it is determined if there are any verbs in $sentence_x$ that have not been processed with respect to the rule(s) and the embedded predicate(s) (328). The NLP module (154) determines the verbs in the sentence. In an exemplary embodiment, the NLP module (154) may employ a data structure with respect to the verb identification, and the data structure may be leveraged at step (328) to assess if there are any more identified verbs remaining to be processed with respect to the rule(s) and embedded predicate(s). A negative response to the determination at step (328) is followed by a return to step (318) or step (324) and a positive response concludes the initial verb evaluation and processing with respect to $sentence_x$. Once all the verbs in $sentence_x$ have been processed, the evaluation and processing of $sentence_x$ is complete. Accordingly, as shown herein, the process of verb evaluation is conducted on a sentence basis.

As shown herein, following a positive response to the determination at step (328), the sentence counting variable is incremented (330) followed by an assessment to ascertain if each of the sentences in $subset_N$ have been evaluated for verb identification and processing (332). A negative response to the assessment is followed by a return to step (312), and a positive response concludes the initial verb identification and processing for $subset_N$. Following a positive response to the determination at step (332), the subset counting variable is incremented (334) followed by an assessment to ascertain if each of the subsets, $N_{Total}$, have been evaluated for verb identification and processing (336). A negative response to the assessment is followed by a return to step (306), and a positive response concludes the initial verb identification and processing. Accordingly, as shown herein, NL text is subject to initial verb identification and processing with respect to dictionary based predicate(s) and non-dictionary based predicate(s).

Figure 4:
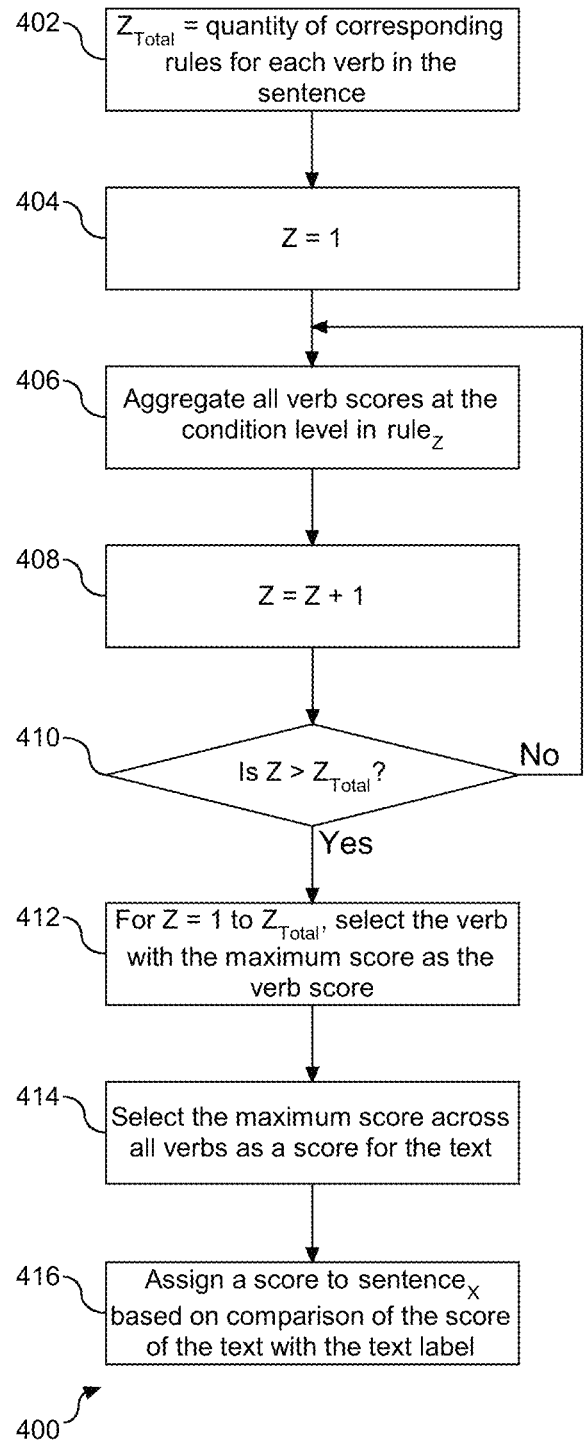
FIG. 4 depicts a flow chart to illustrate a process for aggregating scores from verbs and conditions.

Referring to FIG. 4, a flow chart (400) is provided to illustrate a process for aggregating scores from verbs and conditions into the corresponding sentence. For each verb in the sentence, the variable $Z_{Total}$ is assigned to the quantity of corresponding rules (402), and the rule counting variable, Z, is initialized (404). For each $sentence_x$, e.g. for X=1 to $X_{Total}$, in a $subset_N$, e.g. for N=1 to $N_{Total}$, all the verb scores are aggregated at the condition level in $rule_z$ (406). Following the verb score aggregation, the rule counting variable, Z, is incremented (408). It is then determined if the aggregation has been conducted against each of the rules (410). A negative response to the determination is followed by a return to step (406), and a positive response concludes the verb score aggregation. Following step (410), the verb processing continues with respect to the sentence, e.g. $sentence_x$. As shown, for each of the applicable rules, from Z=1 to $Z_{Total}$, the verb with the maximum score across all the rules is selected as the verb score (412). The text, e.g. $sentence_x$, can include more than one verb, and in an embodiment may include a plurality of verbs. A score comparison of each of the verbs present in $sentence_x$ is employed at step (412), resulting in identification and selection of the verb with the maximum score. For the subject sentence, $sentence_x$, the maximum score across all the verbs is selected as a score for the text (414). The identification, selection, and assignment at step (414) is followed by a comparison of the score of the text, e.g. $sentence_x$, with the text label, e.g. the GT label for $sentence_x$, and an assignment of a score to $sentence_x$ (416). In an example, when a GT label is assigned to a sentence, the GT value is 1 and when the GT label is not assigned to the sentence, the GT value is 0. The comparison at step (416) is an evaluation of the GT label value with the score of $sentence_x$. The comparison at step (416) leverages a loss function, also referred to herein as a gradient, such as, but not limited to, cross-entropy loss, to compute a logarithm of the score. In an embodiment, cross-entropy loss=GT*log(score)+(1−GT)*log(1−score)). In an exemplary embodiment, the score assignment at step (416) is on a scale of 0 to 1. Accordingly, as shown herein, all verb scores assigned to the predicates in a rule are aggregated, and the verb score selection is assigned to the corresponding sentence.

Figure 5:
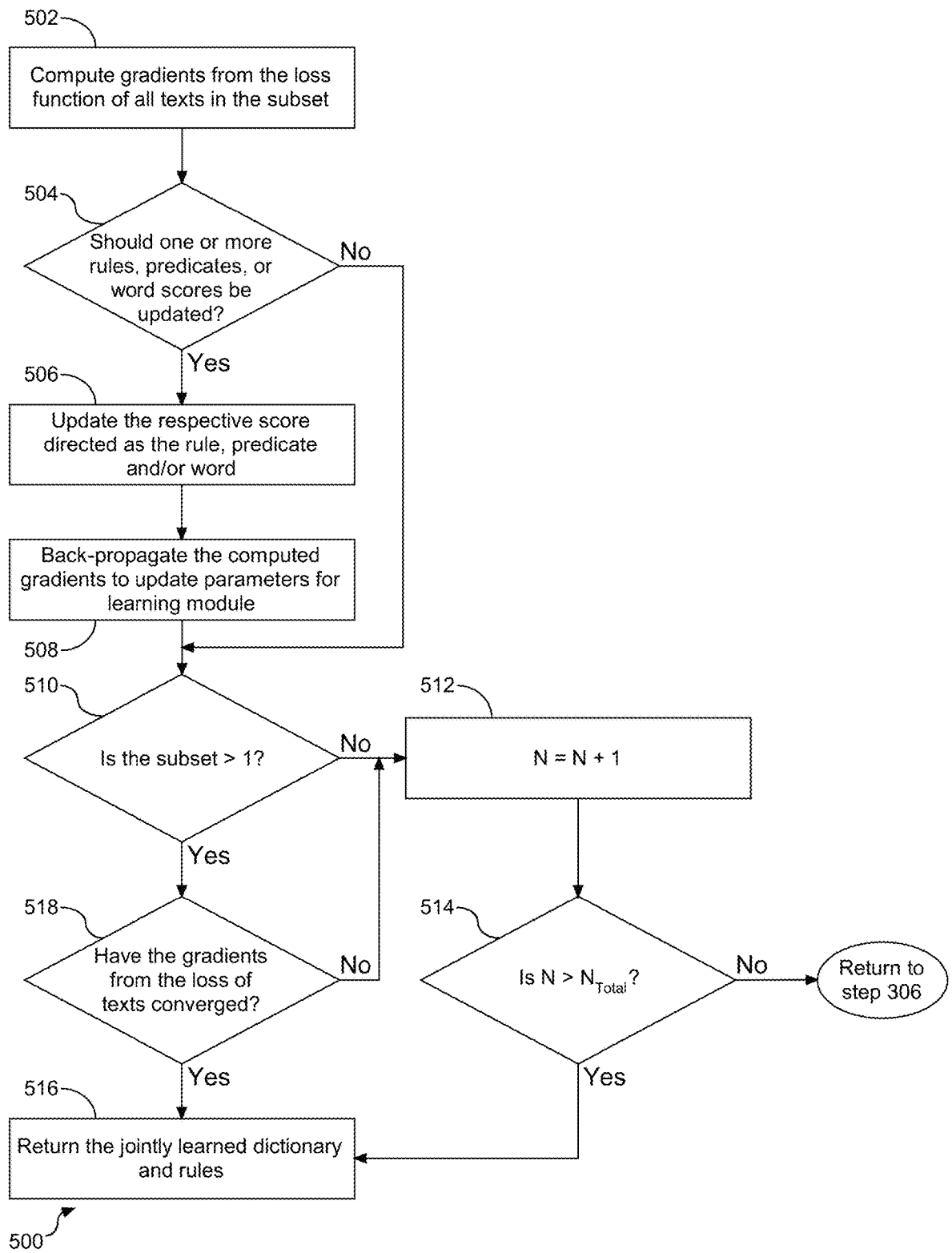
FIG. 5 depicts a flow chart to illustrate a process for selectively and jointly amending both one or more rules and one or more dictionaries responsive to NL text evaluation.

Referring to FIG. 5, a flow chart (500) is provided to illustrate a process for selectively and jointly amending both one or more rules and one or more dictionaries responsive to the NL text evaluation in FIG. 4. An artificial neural network (NN) is used to compute gradients from the loss function of all texts in the subset (502). The gradients provide data directed at the dictionary and the corresponding word score, and the rules are conditions with an assigned score. Based on the computed gradients, it is then determined if one or more of the rule rules, predicates, and word scores should be updated (504). Examples of the scores for the rules, predicates, and words, are shown and described in Equations 1, 2, and 3, respectively. In an exemplary embodiment, the assessment at step (504) is initially directed at the computed change in the rule score, e.g. Δr, as shown and described in Equation 1 with the respective update taking place if the computed change, Δr-r, is non-zero. Similarly, the computed change in the predicate score, e.g. Δp, is subject to an update if the computed change, Δp-p, is non-zero, and the computed change in the word score, e.g. Δw, is subject to an update if the computed change, Δw-w is non-zero. Although shown grouped at step (504), the assessments of the rule, predicate, and word may be conducted separately. Following the assessment(s) at step (504), if the computed change(s) for the score(s) is non-zero, then an update of respective s core(s) directed at the rule, predicate, and word, takes place (506) and the computed gradients are back-propagated through the corresponding NN to update parameters for the learning module (508).

Following step (508) or following a negative response to the determination at step (504), it is determined if the subset subject to evaluation is greater than the integer one (510). The assessment at step (516) is directed at ascertaining if the subset evaluation can be compared to a prior subset evaluation. A negative response to the determination at step (510) is followed by an increment of the subset counting variable (512) and a following assessment to ascertain if the subset counting variable has reached its conclusion (514). In an exemplary embodiment, the assessment at step (514) is an indication that there is no more input text available for the evaluation. A negative response to the assessment at step (514) is followed by a return to step (306) of FIG. 3A, and a positive response is followed by returning the jointly learned dictionary and rules as output (516). Similarly, a positive response to the assessment at step (510) is followed by a subsequent assessment to ascertain if the gradients from the loss of the texts in the subset, as determined in FIG. 4, have converged (518). In an embodiment, convergence is attained when the loss is at or near a minimum. Determining whether convergence is attained can be done in many ways. One approach is to count the number of times the whole labeled data has been evaluated, and once a pre-determined number of passes have been made and at which point no further learning can be achieved, it is determined that convergence is achieved. Another approach is to evaluate the loss. Once the sum of losses across all the labeled data falls below a pre-defined threshold, it is determined that convergence is achieved. Another approach is to check the norm of the gradient vector. Once the norm of the gradient falls below a pre-defined threshold, indicating that the updates to the parameters are minimal, then is it determined that convergence is achieved. A negative response to the determination at step (518) is followed by a return to step (512), and a positive response is followed by a return to step (516). Accordingly, as shown herein once the loss in the gradients of the texts in the subset has converged, the learned dictionary and rules are returned as an updated dictionary and rules that have been selectively modified based on the verb and predicate evaluations.

The process shown in FIGS. 3-5 demonstrate one iteration, also referred to herein as an epoch. When learning dictionary and rules, or in an exemplary embodiment any model, multiple passes over the data takes place. With respect to the processes shown herein, when we reach $N_{Total}$, as shown herein in the form of a positive response to the determination at step (514), one epoch has been completed. If more iterations are to be conducted, a positive response to the determination at step (514) may be followed by a return to step (304) to start the next iteration, e.g. epoch$_2$, instead of returning the jointly learned dictionary and rules as shown at step (516). In an exemplary embodiment, the quantity of iterations may be 100 or more, with the conclusion of the iterations and input processing proceeding to step (516) to return the learned dictionary and rules.

As shown and described herein, a NLP is leveraged to identify verbs present in NL text, with the identified verbs subject to evaluation with respect to a dictionary and one or more rules and their corresponding predicates. A neural network is leveraged to interface with the evaluation to selectively induce joint modification of the one or more rules and the dictionaries based on backpropagation. Embodiments shown and described herein may be in the form of a computer system for use with an AI platform for providing machine learning directed at identifying verbs present in NL text, evaluating the identified verbs with respect to candidate rules and dictionaries, and leveraging AI to selectively and dynamically update the candidate rules and dictionaries. Aspects of the tools (152), (154), (156), and (158) and their associated functionality may be embodied in a computer system/server in a single location, or in an embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the system and processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
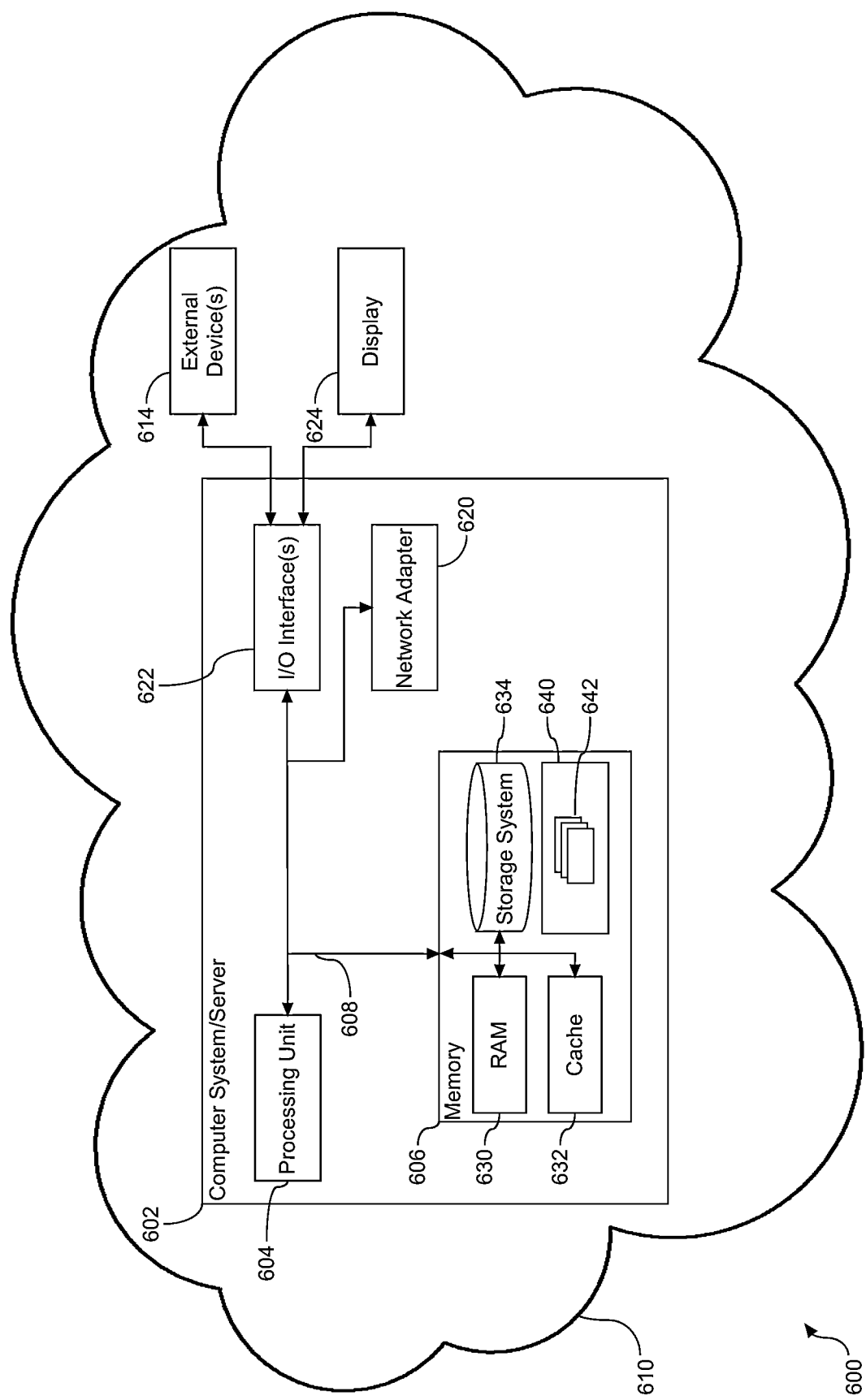
FIG. 6 is a block diagram depicting an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments of the dynamic and selective dictionary and rule learning and modification. For example, the set of program modules (642) may include the modules configured as the tools (152), (154), (156), and (158) described in FIG. 1.

Host (602) may also communicate with one or more external devices (614), such as a keyboard, a pointing device, a sensory input device, a sensory output device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
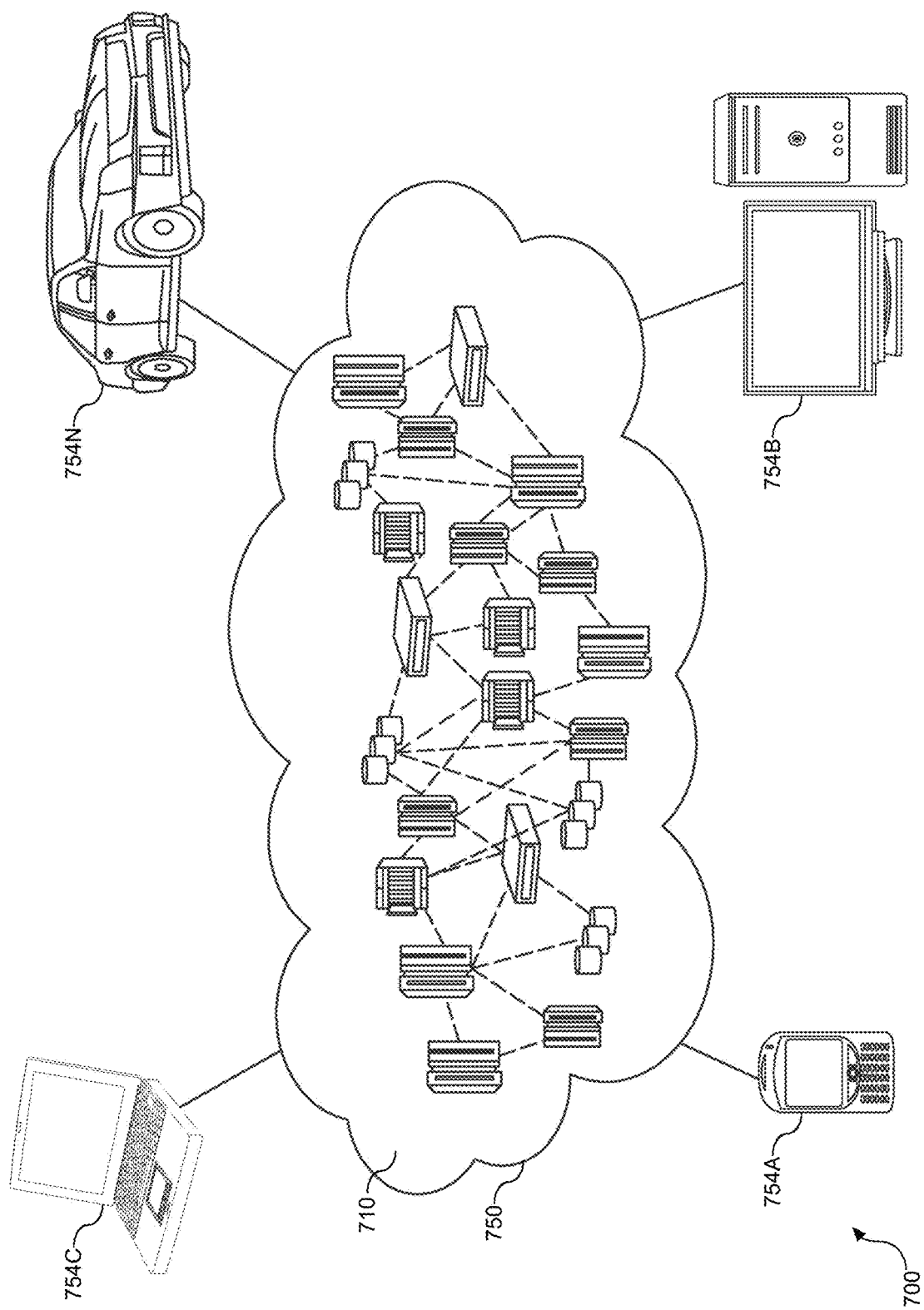
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
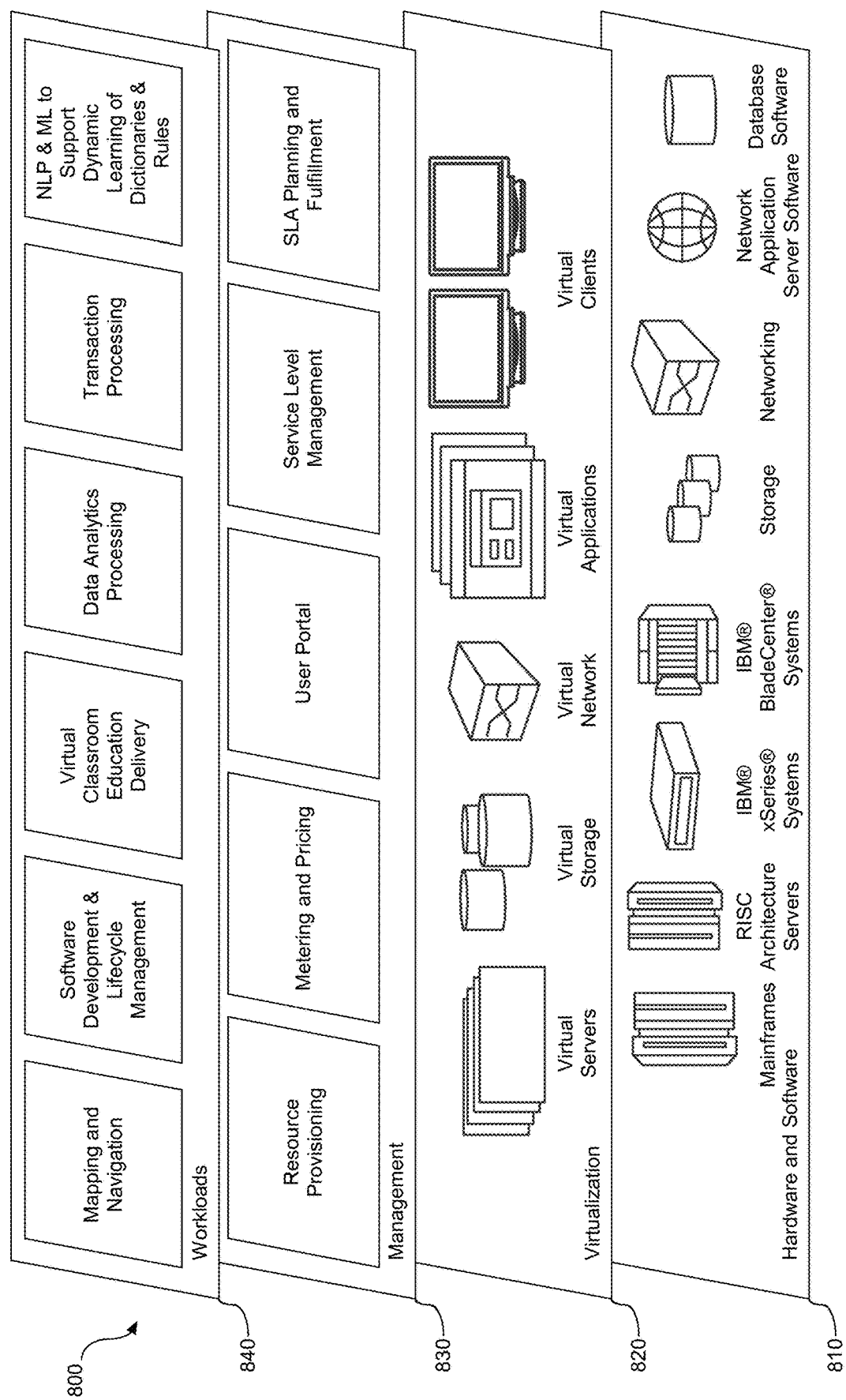
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and NLP and ML to support dynamic learning of dictionaries and rules.

The system and flow charts shown herein may also be in the form of a computer program device for dynamically orchestrating a pre-requisite driven codified infrastructure. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of dynamical orchestration of a pre-requisite driven codified infrastructure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the annotation of unstructured NL data and extraction of facts into a structured format may be carried out by different computing platforms or across multiple devices. Furthermore, the libraries of models may be localized, remote, or spread across multiple systems. Accordingly, the scope of protection of the embodiment(s) is limited only by the following claims and their equivalents.

What is claimed is:

1. A computer system comprising:
    a processor operatively coupled to memory;
    an artificial intelligence (AI) platform, in communication with the processor, the AI platform comprising:
        a text module configured to receive natural language text, and parse the received text into a subset;
        subject the subset to natural language processing, and identify one or more verbs within the subset;
        an evaluator, operatively coupled to the NLP module, configured to evaluate the identified one or more verbs with respect to at least one dictionary and one or more rules, including evaluating each predicate in the one or more rules with respect to the identified one or more verbs;
        an artificial neural network (ANN) configured to:
            process a loss function generated in response to the evaluating, wherein the loss function is utilized by a machine learning module to interface with one or more dictionary and one or more rules; and
            compute one or more gradients from the loss function, wherein the loss function is utilized as feedback by the ANN, and wherein a gradient descent of the one or more gradients is an optimization algorithm used to train the ANN;
        a machine learning (ML) module, operatively coupled to the evaluator, configured to leverage the ANN to jointly induce modification of the one or more rules and the at least one dictionary responsive to the computation of the one or more gradient descents; and
        utilizing, by a machine learning (ML) module, the loss function to selectively and jointly amend the at least one dictionary and the one or more rules based on the computed one or more gradients.

2. The computer system of claim 1, wherein evaluation of the identified one or more verbs with respect to the at least one dictionary and the one or more rules includes the evaluator to assess a score for each of the identified one or more verbs across the one or more rules, and select a maximum score as a subset score for the subset, wherein the score is parameters that are updated through backpropagation.

3. The computer system of claim 2, wherein the subset has one or more sentences, and further comprising the evaluator to identify a ground truth label for each sentence in the subset, compare the ground truth label with the subset score, the comparison to generate a loss function.

4. The computer system of claim 3, further comprising the ML module configured to selectively amend the at least one dictionary and the one or more rules responsive to the computed one or more gradients.

5. The computer system of claim 4, further comprising the ML module configured to back-propagate the computed one or more gradients through the neural network responsive to the selective dictionary and rule amendment.

6. The computer system of claim 1, wherein the leverage of the neural network further compromises the neural network to process a loss function in response to the evaluation, and to compute one or more gradients from the loss function.

7. The computer system of claim 6, wherein the jointly induced modification of the one or more rules and the at least one dictionary is in response to the computed one or more gradients.

8. A computer program product comprising a computer readable storage medium having program code embodied therewith that, when executed by at least one processor, cause a computing device to:
    receive natural language text, and parse the received text into a subset;
    subject the subset to natural language processing, and utilize a machine-learning model to identify one or more verbs within the subset;
    evaluating the identified one or more verbs with respect to at least one and one or more rules, including evaluating each predicate in the one or more rules with respect to the identified one or more verbs; and
    leveraging an artificial neural network (ANN) to:
        process a loss function generated in response to the evaluating, wherein the loss function is utilized by a machine learning module to interface with one or more dictionary and one or more rules; and
        compute one or more gradient descents from the loss function, wherein the loss function is utilized as feedback to train the ANN, and wherein the gradient descent is an optimization algorithm used to train the ANN;
    jointly inducing modification of the one or more rules and the at least one dictionary responsive to the computation of the one or more gradient descents; and
    utilizing, by a machine learning (ML) module, the loss function to selectively and jointly amend the at least one dictionary and the one or more rules based on the computed one or more gradients.

9. The computer program product of claim 8, wherein the program code configured to evaluate the identified one or more verbs with respect to the at least one dictionary and the one or more rules includes assessing a score for each of the identified one or more verbs across the one or more rules, and selecting a maximum score as a subset score for the subset.

10. The computer program product of claim 9, wherein the subset has one or more sentences, and further comprising program code configured to identify a ground truth label for each sentence in the subset, compare the ground truth label with the subset score, the comparison to generate the loss function.

11. The computer program product of claim 10, further comprising program code configured to selectively amend the at least one dictionary and the one or more rules responsive to the computed one or more gradients.

12. The computer program product of claim 11, further comprising program code configured to back-propagate the computed one or more gradients through the neural network responsive to the selective dictionary and rule amendment.

13. A computer implemented method, for learning both rules and dictionaries, the computer-implemented method comprising:
receive natural language text, and parse the received text into a subset;
subject the subset to natural language processing, and utilize a machine-learning model to identify one or more verbs within the subset;
evaluating the identified one or more verbs with respect to at least one dictionary and one or more rules, including evaluating each predicate in the one or more rules with respect to the identified one or more verbs; and
leveraging an artificial neural network (ANN) to:
process a loss function generated in response to the evaluating, wherein the loss function is utilized by a machine learning module to interface with one or more dictionary and one or more rules; and
compute one or more gradient descents from the loss function, wherein the loss function is utilized as feedback to train the ANN, and wherein the gradient descent of the one or more gradients is an optimization algorithm used to train the ANN;
jointly inducing modification of the one or more rules and the at least one dictionary responsive to the computation of the one or more gradients; and
utilizing, by a machine learning (ML) module, the loss function to selectively and jointly amend the at least one dictionary and the one or more rules based on the computed one or more gradients.

14. The method of claim 13, wherein evaluating the identified one or more verbs with respect to the at least one dictionary and the one or more rules includes assessing a score for each of the identified one or more verbs across the one or more rules, and selecting a maximum score as a subset score for the subset.

15. The method of claim 14, wherein the subset has one or more sentences, and further comprising identifying a ground truth label for each sentence in the subset, comparing the ground truth label with the subset score, the comparison generating the loss function.

16. The method of claim 15, further comprising selectively amending the at least one dictionary and the one or more rules responsive to the computed one or more gradients.

17. The method of claim 16, further comprising back-propagating the computed one or more gradients through the neural network responsive to the selective dictionary and rule amendment.

18. The method of claim 17, wherein the selective amendment further comprises updating one or more scores, the scores including a rule score, a predicate score, and a word score.

* * * * *